(12) United States Patent
Kalyani et al.

(10) Patent No.: US 9,564,987 B2
(45) Date of Patent: Feb. 7, 2017

(54) ADAPTIVE LINK ADAPTATION SYSTEM AND METHOD

(71) Applicant: Centre of Excellence in Wireless Technology, Chennai (IN)

(72) Inventors: Sheetal Kalyani, Chennai (IN); Narendran Krishnan, Chennai (IN); Saishankar Katri Pulliyakode, Chennai (IN)

(73) Assignee: CENTRE OF EXCELLENCE IN WIRELESS TECHNOLOGY, Chennai (IN)

( * ) Notice: Subject to any disclaimer, the term of this patent is extended or adjusted under 35 U.S.C. 154(b) by 96 days.

(21) Appl. No.: 14/617,853

(22) Filed: Feb. 9, 2015

(65) Prior Publication Data
US 2015/0229435 A1 Aug. 13, 2015

(51) Int. Cl.
*H04W 4/00* (2009.01)
*H04L 1/00* (2006.01)
*H04W 24/06* (2009.01)
*H04L 5/00* (2006.01)
*H04L 1/16* (2006.01)
*H04L 1/18* (2006.01)

(52) U.S. Cl.
CPC .......... *H04L 1/0009* (2013.01); *H04L 1/0003* (2013.01); *H04L 1/0019* (2013.01); *H04L 1/0035* (2013.01); *H04L 1/1607* (2013.01); *H04L 5/0057* (2013.01); *H04W 24/06* (2013.01); *H04L 1/0016* (2013.01); *H04L 1/0026* (2013.01); *H04L 1/1812* (2013.01)

(58) Field of Classification Search
None
See application file for complete search history.

(56) References Cited

U.S. PATENT DOCUMENTS

| | | | | |
|---|---|---|---|---|
| 2004/0266451 A1* | 12/2004 | Stolyar | ............... | H04L 1/0003 455/452.2 |
| 2007/0218847 A1* | 9/2007 | Cho | ............... | H04L 1/0003 455/102 |
| 2009/0276674 A1* | 11/2009 | Wei | ............... | H04L 1/16 714/749 |
| 2011/0211657 A1* | 9/2011 | Cho | ............... | H04B 7/0417 375/299 |
| 2011/0243012 A1* | 10/2011 | Luo | ............... | H04L 5/0055 370/252 |

(Continued)

*Primary Examiner* — Anh-Vu Ly

(57) ABSTRACT

The embodiments described herein provide a method and system for improve link adoption performance in wireless networks. The method for modifying the MCS index for transmission using a computed offset is provided. The offset is calculated based on HARQ feedback of transmissions. A transition probability matrix with plurality of MCS indices is used for selecting the MCS index for transmission based on the highest probability of transition. A pattern sequence of MCS indices is formed and the presence of the pattern is determined in the history of the HARQ transmissions. The frequency of the pattern presence is also determined and the MCS index is selected for the HARQ transmissions. A frequency database of MCS indices is built using source encoding techniques. The transition probabilities that are estimated from the frequency database along with a cost function associated with each MCS index will be used to compute next MCS index.

36 Claims, 10 Drawing Sheets

| MCS INDEX | 15 | 16 | 18 | 21 | 24 |
|---|---|---|---|---|---|
| 15 | 0.3 | 0.5 | 0.15 | 0.05 | 0 |
| 16 | 0.2 | 0.2 | 0.4 | 0.2 | 0 |
| 18 | 0.1 | 0.1 | 0.2 | 0.5 | 0.1 |
| 21 | 0 | 0 | 0.2 | 0.4 | 0.2 |
| 24 | 0 | 0 | 0.1 | 0.4 | 0.5 |

(56) References Cited

U.S. PATENT DOCUMENTS

| | | | |
|---|---|---|---|
| 2012/0082145 A1* | 4/2012 | Chen | H04L 1/0029 370/338 |
| 2012/0134285 A1* | 5/2012 | Mikami | H04L 1/0009 370/252 |
| 2012/0142399 A1* | 6/2012 | Taoka | H04L 1/0009 455/561 |
| 2013/0343255 A1* | 12/2013 | Han | H04L 1/0009 370/312 |
| 2015/0092681 A1* | 4/2015 | Fernando | H04W 24/10 370/329 |

* cited by examiner

FIG. 4

| MCS INDEX | 15 | 16 | 18 | 21 | 24 |
|---|---|---|---|---|---|
| 15 | 0.3 | 0.5 | 0.15 | 0.05 | 0 |
| 16 | 0.2 | 0.2 | 0.4 | 0.2 | 0 |
| 18 | 0.1 | 0.1 | 0.2 | 0.5 | 0.1 |
| 21 | 0 | 0 | 0.2 | 0.4 | 0.2 |
| 24 | 0 | 0 | 0.1 | 0.4 | 0.5 |

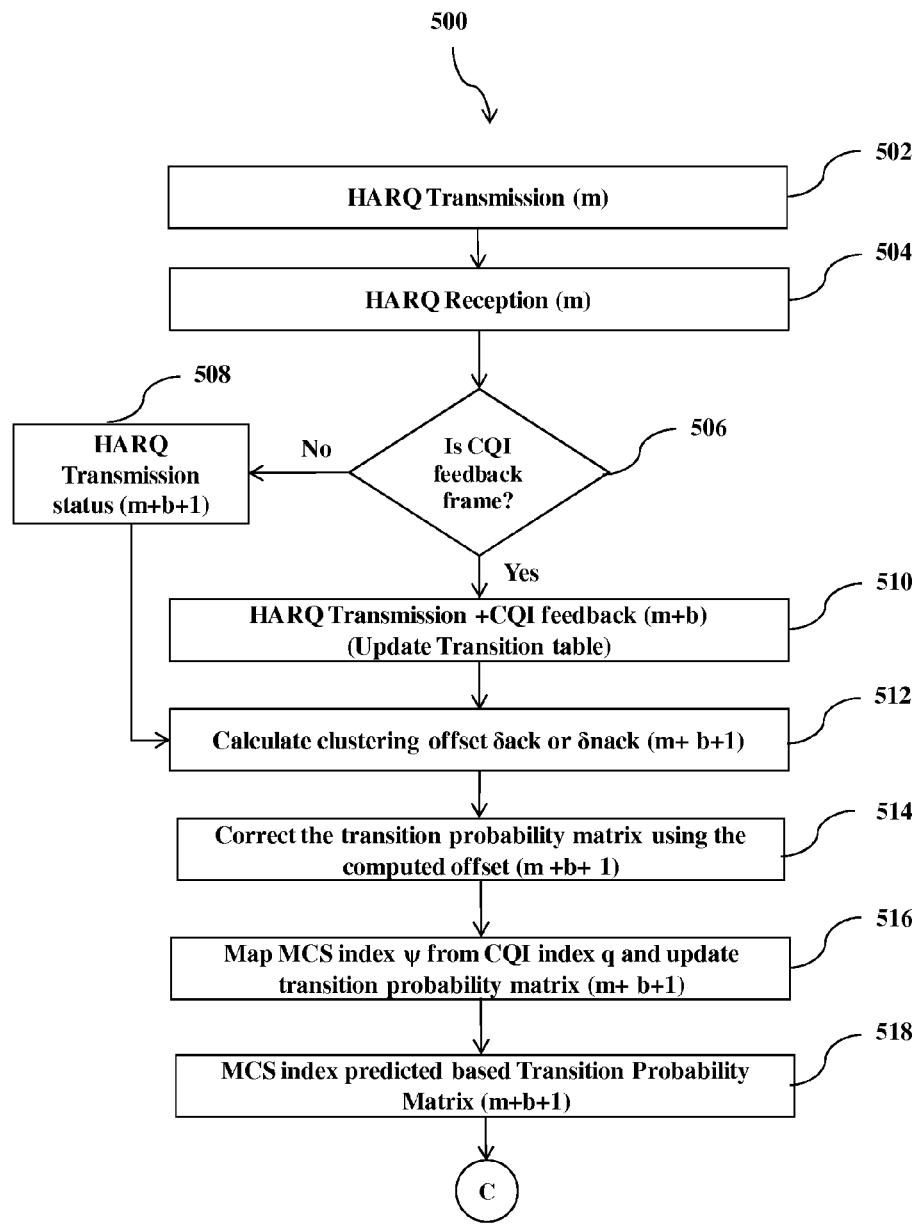

FIG. 7

| SEQUENCE | FREQUENCY INDEX |
|---|---|
| (17,18,20) | 7 |
| (21,23,26) | 10 |
| (18,20,21) | 21 |
| (24,22,24) | 2 |
| (21,19,18) | 15 |

ADAPTIVE LINK ADAPTATION SYSTEM AND METHOD

FIELD OF EMBODIMENT

The present embodiment relates to wireless networks and more particularly to link adaptation methods for maximum channel utilization.

BACKGROUND OF EMBODIMENT

Based on channel information available at a transmitter, the transmission capacity of the channel can be increased by adapting link parameters like transmission power, modulation level, and channel coding. This is called link adaptation (LA) in general. If the transmission power is held constant while modulation and coding scheme is varied accordingly with the channel realization, then it is called as Adaptive Modulation and Coding (AMC). In the following, various combinations of the modulation and coding is called as Modulation and Coding Scheme (MCS). Each of the MCS is identified by an index and that is called MCS index. Similarly, a standard form of the information about the channel state is called Channel State Information (CSI). The entire system bandwidth is divided into smaller units for two different purposes: resource allocation and channel information feedback. With respect to resource allocation the system bandwidth is divided into smaller units called Resource Allocation Units (RAU). Similarly, for channel information reporting the same system bandwidth is divided in different granularity (finer or coarser) and it's called as Channel Information Reporting Unit (CIRU). The receiver reports a single CQI index for each of the CIRU. The granularity of CIRU may be greater or lesser than the granularity of RAU. If granularity of RAU is greater, then more than one RAU may constitute a CIRU. In which case, all the RAUs corresponding to that CIRU assume the MCS index value mapped from the corresponding channel quality index (CQI index). If the granularity of the RAU is smaller, then more than one CIRU may constitute a RAU. In this case, the RAU assumes the average value of MCS indices mapped from each of the CQI index corresponding to the constituent CIRUs. Eventually, each of the RAU has a MCS index associated to it which can be used by scheduler and eventually by the transmitter when transmitting on it.

Consider a system with N UEs. Let there be S number of CIRU and R number of RAU in the system. Then, let $q_{n,s}(m)$, m=1, 2 ... ∞ up denote the CQI reported on the sth CIRU by $n^{th}$ receiver during mthsub-frame and $q_{n,s} \in Q$, where Q is the set of all possible CQI indices. Similarly, let $\psi_{n,s}(m)$, m=1, 2 .... ∞ denote the MCS Index chosen for the transmission of the rth RAU to $n^{th}$ receiver during mth sub-frame and $\psi_{n,r} \in \Psi$. $\Psi$ is the set of all possible MCS indices and L is the cardinality of $\Psi$ which is actually the total number MCS indices available. Then, the mapping function f:Q→$\Psi$ depends on the wireless technology that is used. While each CIRU is associated with $q_{n,s}$, each RAU is associated with $\psi_{n,r}$. Thus, $q_{n,s}$ forms the input of the AMC scheme and $\psi_{n,r}$ serve as the input to the scheduling technique.

At any point in time $q_{n,s}(m)$ can be at least h sub-frames old, where h is the CQI reporting delay. Let $\phi$, $\phi$=0, ..., h−1 denotes the sub frames elapsed since the last CQI feedback. Then (m−$\phi$) is the sub frame when the last feedback happened and $q_{n,s}(m-\phi)$ is the most recent CQI Index available for the $s^{th}$ CIRU in $n^{th}$ receiver. Thus, for the sub-frames from m−$\phi$ to m−$\phi$+h, $\psi_{n,r}$ can be mapped from $q_{n,s}(m-\phi)$.

The following steps are involved in the normal link adaptation system. The FIG. 1 described the steps involved in the normal link adaptation system.

At step 102: [Sub-frame m, Transmitter]: Perform HARQ transmission. After forming a transmission unit whose size is determined by a MCS index used and a number resource allocation unit allocated. Based on the number of RAUs allocated during scheduling and the MCS Index chosen, an eNodeB can decide the amount of application data that can be transmitted in this transmission opportunity. The eNodeB combines all the allocated RAUs, adds Forward Error Correction (FEC) coding information and transmits it as Transport Blocks (TB). This FEC coding information used by the UE to do error detection and error correction in case of erroneous transmission. Either if there is no error or if the FEC coding is sufficient to do error correction the UE sends a HARQ ACK, else sends a HARQ NACK. When a NACK is received, the eNodeB increases the coding level and transmits the same TB, when the corresponding UE gets scheduling opportunity. This process is repeated either until the UEs receives the TB without error or if the process has been repeated a predetermined maximum number of times. There is an unavoidable delay between the instance at which the eNodeB transmits the TB and the instance at which it receives ACK/NACK from the UE. But the eNodeB can schedule the same UE using another instance HARQ. Each instance of HARQ is called HARQ process.

At step 104: [Sub-frame m, Receiver]: Perform HARQ reception to determine if a current transmission is HARQ success or failure.

At step 106: [Sub-frame m+b, Receiver]: Transmit ACK/NACK feedback to the transmitter.

At step 108: Determine whether the current subframe is a CQI feedback sub frame, At step 110: If the current feedback CQI feedback then the CQI information is reported to the transmitter. This step does not happen every sub frame.

At step 112: [Sub-frame m+b+1, Transmitter]: The transmitter maps $q_{n,s}$ to $\psi_{n,s}$.

At step 114: [Sub-frame m+b+1, Transmitter]: The transmitter performs bandwidth scheduling which allocates each RA unit to a receiver n based on a scheduling criteria.

OBJECT OF EMBODIMENT

The principal object of the embodiments herein is to provide a method and system for link adaptation in wireless networks.

Another object of the embodiments herein is to modify a MCS index for transmission using a computed offset.

Another object of the embodiments herein is to compute an offset using a HARQ feedback received in response to a HARQ transmission.

Another object of the embodiments herein is to select the MCS index for transmission from a transition probability matrix.

Another object of the embodiments herein is to select the MCS index using a pattern sequence of MCS indices.

Another object of the embodiments herein is to build a frequency database using MCS indices, using transition probabilities between one MCS index to another and associating a cost function with each MCS.

SUMMARY

Accordingly the embodiments herein provide a method for selecting a modulation and coding scheme (MCS) for transmission on at least one communication channel. The method includes computing at least one transition probability matrix including a plurality of MCS indices, wherein the transition probability matrix includes of at least one probability of transition from each MCS index to another the MCS index. Further, the method includes selecting the MCS index for transmission corresponding to a highest transition probability in the transition probability matrix.

Accordingly the embodiments herein provide a method for selecting a Modulation and Coding Scheme (MCS) for transmission on at least one communication channel. The method includes forming a pattern including a sequence of MCS indices, wherein each MCS index is associated with a HARQ feedback indicating one of positive acknowledgement and negative acknowledgement. Further, the method includes determining whether the pattern including the sequence of MCS indices is available in a transmission history associated with at least one receiver, if the predicted MCS index is greater than the current MCS index. Furthermore, the method includes selecting last MCS index in the pattern including the sequence of MCS indices for transmission in response to determining that the pattern including the sequence of MCS indices is available in the transmission history.

Accordingly the embodiments herein provide a method for selecting a Modulation and Coding Scheme (MCS) for transmission on at least one communication channel. The method includes constructing a frequency database, of at least one sequence of MCS indices used for transmission, wherein the frequency database corresponds to a frequency of appearance of each MCS index in at least one sequence. Further, the method includes computing a probability of transition from each MCS index sub-sequence to another the MCS index in at least one sequence based on the frequency of appearance of each MCS index in at least one sequence. Furthermore, the method includes selecting the MCS index for transmission corresponding to a highest probability of transition.

Accordingly the embodiments herein provide an electronic device to select a modulation and coding scheme for transmission on at least one communication channel. The electronic device includes a transition probability module configured to compute at least one transition probability matrix including a plurality of MCS indices, wherein the transition probability matrix corresponds to at least one probability of transition from each MCS index to another the MCS index. Further, the electronic device includes a controller module configured to select the MCS index for transmission corresponding to a highest transition probability in the transition probability matrix.

Accordingly the embodiments herein provide an electronic device to select a modulation and coding scheme for transmission on at least one communication channel. The electronic device includes a pattern module configured to form a pattern including a sequence of MCS indices, wherein each MCS index is associated with a HARQ feedback to indicate one of positive acknowledgement and negative acknowledgement. Further, electronic device includes a controller module configured to determine whether the pattern including the sequence of MCS indices is available in a transmission history associated with at least one receiver. Further, the controller module is configured to select last MCS index in the pattern including the sequence of MCS indices for transmission in response to determining that the pattern including the sequence of MCS indices is available in the transmission history.

Accordingly the embodiments herein provide an electronic device to select a modulation and coding scheme for transmission on at least one communication channel. The electronic device includes a builder module configured to construct a frequency database of at least one sequence of MCS indices used for transmission, wherein the frequency database corresponds to a frequency of appearance of each MCS index in at least one sequence. Further, the electronic device includes a controller module configured to compute a probability of transition from each MCS index sub-sequence to another the MCS index in at least one sequence based on the frequency of appearance of each MCS index in at least one sequence. Further, the controller module is configured to select the MCS index for transmission corresponding to a highest probability of transition.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This embodiment is illustrated in the accompanying drawings, throughout which like reference letters indicate corresponding parts in the various figures. The embodiments herein will be better understood from the following description with reference to the drawings, in which:

FIG. 4 illustrates an example transition probability matrix, according to embodiments disclosed herein;

FIG. 7 illustrates an example table showing different sequence of pattern and the frequency of occurrence of each pattern in the dictionary, according to embodiments disclosed herein;

DETAILED DESCRIPTION OF EMBODIMENT

Figure 1:
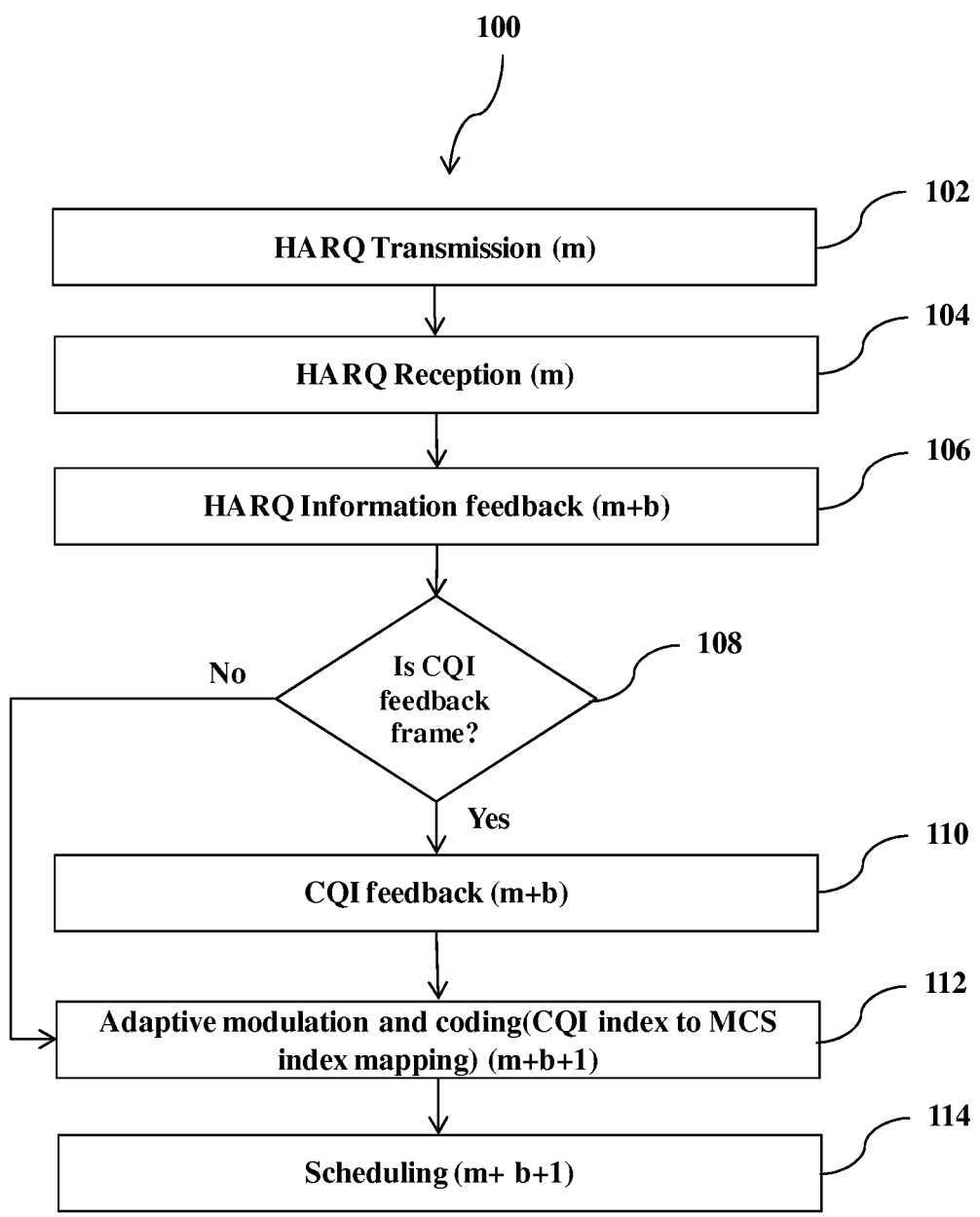
FIG. 1 is a flow diagram illustrating a method of link adaptation used in prior art, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

In another embodiment, a method and system for selecting a MCS for transmission is disclosed. A transition probability matrix including a plurality of MCS indices is computed. The transition probability matrix includes probability of transition from one MCS index to another MCS index. An MCS index is selected based on the highest transition probability.

In yet another embodiment, a method and system for selecting a MCS for transmission is disclosed. A pattern is formed including a sequence of MCS indices of pre-defined size. The presence and frequency of the pattern in the history of transmissions is determined and an MCS index from the pattern is selected accordingly.

In yet another embodiment, a method and system for selecting a MCS for transmission is disclosed. A frequency database is constructed using a sequence of MCS indices. A cost function is associated with each MCS index and a MCS index is selected corresponding to highest transition probability from the frequency database.

Referring now to the drawings, and more particularly to FIGS. 1 through 10, where similar reference characters denote corresponding features consistently throughout the figures, there are shown preferred embodiments.

Figure 2:
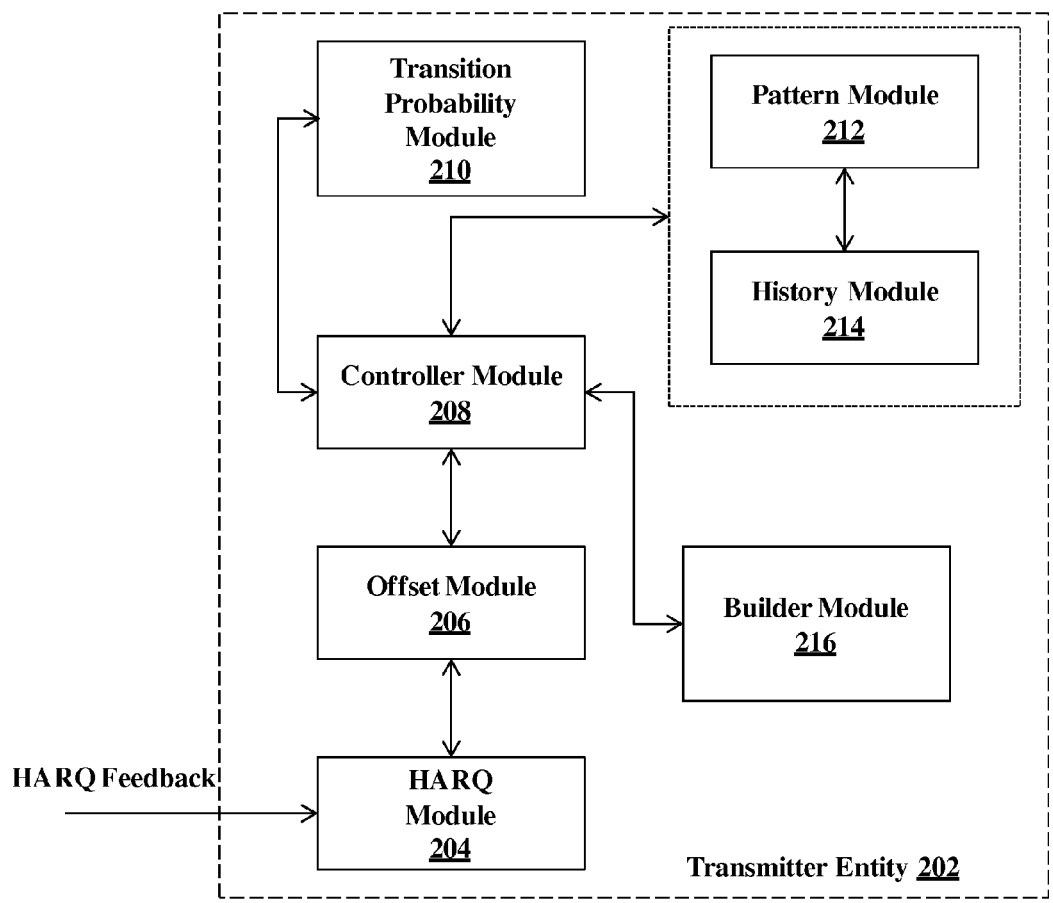
FIG. 2 is a block diagram illustrating link adaptation technique used at a transmitter end, according to embodiments as disclosed herein.

FIG. 2 is a block diagram illustrating a link adaptation technique used at a transmitter end, according to embodiments as disclosed herein. In an embodiment, a system includes a transmitter entity 202 including a Hybrid automatic repeat request (HARQ) module 204, an offset module 206, a controller module 208, a transition probability module 210, a pattern module 212, a history module 214, and a builder module 216.

The HARQ module 204 can be configured to identify a HARQ feedback received from a receiver. Based on the acknowledgement received in the HARQ module 204 the offset module 206 can be configured to compute an MCS offset. The controller module 108 can be responsible for the selection of the MCS index used for HARQ transmission over a communication channel. The transition probability matrix module 110 can be configured to compute a transition probability matrix (TPM) containing a transition probability from one MCS index to another MCS index.

The pattern module 212 can be configured to create a pattern of MCS indices to verify the MCS index selected using the transition probability module 210. The history module 214 contains history of MCS index used for transmission.

Figure 3:
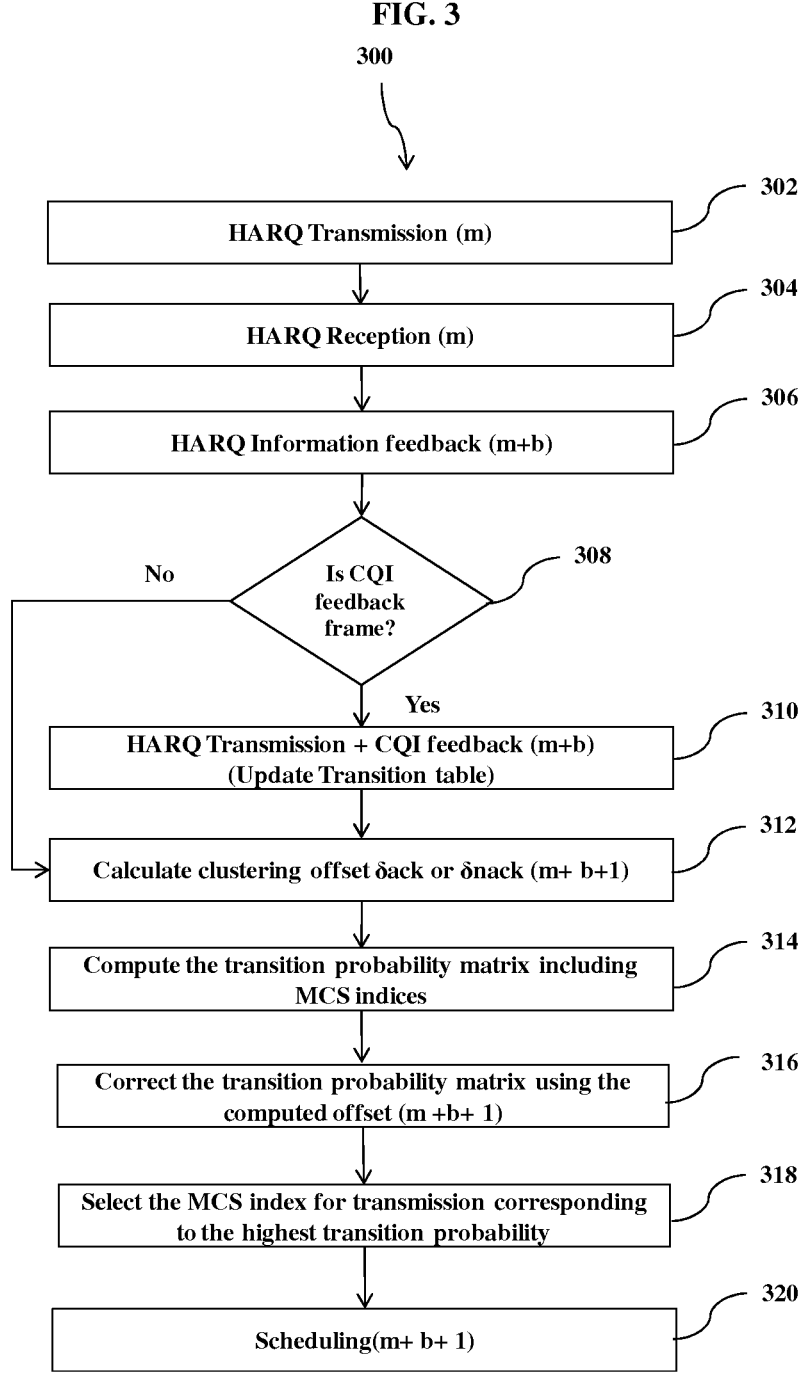
FIG. 3 is a flow diagram illustrating a method of selecting an MCS index using a transition probability matrix, according to embodiments disclosed herein.

FIG. 3 illustrates a flowchart describing a method 300 of selecting an MCS index using a transition probability matrix, according to embodiments disclosed herein. In an embodiment, the method 300 includes the following steps:

At step 302: Perform HARQ transmission. After forming a transmission unit whose size is determined by a MCS index used and a number resource allocation units allocated. Based on the number of RAUs allocated during scheduling and the MCS Index chosen, an eNodeB can decide the amount of application data that can be transmitted in this transmission opportunity. The eNodeB combines all the allocated RAUs, adds Forward Error Correction (FEC) coding information and transmits it as Transport Blocks (TB). This FEC coding information used by the UE to do error detection and error correction in case of erroneous transmission. Either if there is no error or if FEC coding is sufficient to do error correction the UE sends a HARQ ACK, else sends a HARQ NACK. When a NACK is received, the eNodeB increases the coding level and transmits the same TB, when the corresponding UE gets scheduling opportunity. This process is repeated either until the UEs receives the TB without error or if the process has been repeated a predetermined maximum number of times. There is an unavoidable delay between the instance at which the eNodeB transmits the TB and the instance at which it receives ACK/NACK from the UE. But the eNodeB can schedule the same UE using another instance HARQ. Each instance of HARQ is called HARQ process.

At step 304: [Sub-frame m, Receiver]: Perform HARQ reception to determine if a current transmission is HARQ success or failure.

At step 306: [Sub-frame m+b, Receiver]: Transmit ACK/NACK feedback to the transmitter.

At step 308: Determine whether the frame is a CQI feedback Frame?

At step 310: If the current feedback CQI feedback, then the CQI information is reported to the transmitter (update transition table). This step may not occur for every sub frame.

At step 312: Based on the HARQ feedback calculate a correction offset δack or δnack (m+b+1) using some feedback based correction method. At step 314: Compute the transition probability matrix including MCS indices.

At step 316: Correct the transition probability matrix using the computed offset (m+b+1).

At step 318: Select the MCS index for transmission corresponding to the highest transition probability.

At step 320: Schedule (m+b+1) the HARQ transmissions with the selected MCS index.

The system and method can be viewed as feedback system where the information in the form of CQI index is reported every h sub-frames by n receiver to their corresponding transmitter. Based on the CQI information $q_{n,s}$, the state of the transmitter corresponding to the $n^{th}$ receiver, $\psi_{n,s}$ (or $f(q_{n,s})$) changes. After every feedback process, the transmitter can have N×S CQI indices corresponding to n receivers and s CIRU. These N×S CQI indices in turn get mapped to N×R MCS indices. Each $\psi_{n,r}$ varies randomly with time. Since $\Psi$ is discrete set, each of $\psi_{n,s}(m)$ can be defined as a discrete random variable. The transitions of discrete state random process can be represented using transition probability matrix. There are N×R numbers of processes in the system. Hence, N×R transition probability matrices are required to represent the system accurately. But that becomes highly cumbersome. Consider a system with $\Psi=\{15, 16, 18, 21, \text{and } 24\}$. Table in the FIG. 4 shows a transition probability matrix forgiven receiver on a given RAU.

The entire system with one transition probability matrix can be approach. In this approach, the variations among the users and the variations across the frequency cannot be captured distinctly. Such a matrix becomes an over simplification of the process. As a trade-off, feedback process can be captured through N transition matrices, each one representing a receiver. Although this may not be accurate, N transition matrices provides a fair approximation of the system with respect to MCS Index transitions. Hence, given the MCS index mapped from the most recent CQI index, the MCS index to be used for current transmission by a transmitter can be predicted from the corresponding transition matrix.

Let's assume that the transition probability matrix is maintained for each receiver. Let $X_n(m)$ denote the system transition probability matrix at $m^{th}$ sub-frame for the $n^{th}$ receiver. If there are L MCS indices, then, $X_n(m)$ can be a L×L matrix whose elements $x_n(i,j)$ gives the probability of transition from MCS index i to MCS index j. To form and maintain $X_n(m)$, another matrix is required, system transition count matrix $Y_n(m)$. The elements of $Y_n(m)$, $x_n(i,j)$ denote the transition count from MCS index i to MCS index j. Irrespective of whether $n^{th}$ receiver is scheduled; the mapping $\psi_{n,s}(m)=f(q_{n,s})$ is performed for each n and s during every feedback. Therefore, if the values received are $\psi_{n,s}(m-h)=i$ and, $\psi_{n,s}(m)=j$ which are available after every feedback, they can be used to update $X_n(m)$. Elements of $X_n(m)$ and $Y_n(m)$ are updated as below:

$$y_{n,s}(i, j) = y_{n,s}(i, j) + 1 \quad (3)$$

$$x_{n,s}(i, j) = \frac{y_{n,s}(i, j)}{\sum_{i=1}^{R} y_{n,s}(i, j)} \quad (4)$$

For a given receiver, the above equations 3 and 4 can be executed R times on $X_n(m)$ corresponding to R RAUs. Thus, totally, it executes for N×R times for every CQI feedback. $X_n(m)$, can be random matrix which changes with m. For each receiver-RAU combination, a transition probability matrix can be maintained. There can be N×R such matrices. Let $X_{n,r}(m)$ denote the transition probability matrix and $x_{n,s}(i,j)$ be its elements.

$$y_{n,s}(i, j) = y_{n,s}(i, j) + 1 \quad (5)$$

$$x_{n,s}(i, j) = \frac{y_{n,s}(i, j)}{\sum_{i=1}^{R} y_{n,s}(i, j)} \quad (6)$$

Consider the case where a single transition probability matrix is maintained for the entire system. Let $X(m)$ the transition probability matrix and x (i, j) be its elements. The equation used for updating $X(m)$ is given by:

$$y_{n,s}(i, j) = y_{n,s}(i, j) + 1 \quad (7)$$

$$x_{n,s}(i, j) = \frac{y_{n,s}(i, j)}{\sum_{i=1}^{R} y_{n,s}(i, j)} \quad (8)$$

Apart from updating $X_n(m)$ as described in the previous step, it can be corrected using the correction offset value calculated using any of the suitable feedback based correction method. For every sub frame, and for each receiver, the feedback based correction offset is calculated. In case of change in the value of the correction offset $\phi_n$, $\psi_{n,s}(m)$ is corrected as below:

$$\phi_{n,s}(m)=\phi_{n,s}(m)+\delta_n \quad (9)$$

Using the equation (9), $\psi_{n,s}(m)$ can be corrected which may be in turn used for updating the $X_n(m)$. The errors in $\psi_{n,r}$ which occurred in the current sub-frame can be corrected. But the errors that occurred in the past can still not be corrected. The $X_n(m)$ as a whole can be corrected, based on $\delta_n$. To update the $X(m)$, the $Y_n(m)$ need to be updated first. The $Y_n(m)$ can be updated as below:

$$y(i,j)=y(i+1,j+1),\ i,j=1,2\ldots R-1 \quad (10)$$

$$y(i,R)=0,\ i=0,1,2\ldots R \quad (11)$$

$$y(R,j)=0,\ j=0,1,2\ldots R \quad (12)$$

Due to this correction to the $X_n(m)$, there can be an overall reduction in the probability of the transitions to the higher MCS indices given a MCS index. Let us consider $n^{th}$ receiver and understand the method of prediction. It is know that m−φ is the last sub-frame in which the CQI feedback happened. Hence, in the current sub frame m, $\psi_{n,r}(m-\phi)$ can be used and $\psi_{n,r}(m)$ can be predicted. The predicted MCS index can be used for transmission if $n^{th}$ receiver can be scheduled and is allocated $r^{th}$ RAU. The row corresponding to the $\psi_{n,r}(m-\phi)$ in the transition probability matrix can give the transition probabilities for the transitions from the $\psi_{n,r}$ (m−φ) to all the MCS indices including itself. Using this row, prediction can be done in two different ways.

A simple method can be to predict the MCS index corresponding to the largest element in the row. Let us consider the transition probability matrix shown in a table in the FIG. 4. The ψ(m−φ)=18. In the row corresponding to the MCS index 18, 0.5 is the largest element which actually corresponds to the MCS index 21. Therefore ψ(m)=21.

Instead of $\psi_{n,r}(m-\phi)$, the $\psi_{n,r}(m)$ can be used as an input for the scheduling technique that may run after this. This prediction must be done for each N×R receiver-RAU combination, depending on the number of transition probability matrix used:

A. If a single TPM is being used, all N×R predictions are done using X (m)

B. If for each receiver one TPM is being used, all predictions pertaining to a given $n^{th}$ receiver is predicted using $X_n$ (m)

C. If for each receiver-RAU pair one TPM is being used, the prediction corresponding to $n^{th}$ receiver and $r^{th}$ RAU is done using $X_{n,s}(m)$ FIG. 4 illustrates an example transition probability matrix, according to embodiments disclosed herein. The transition probability matrix presents a probability percentage associated with each transition. For example, the transition from the MCS index 18 to the MCS index 21 has the highest probability at 50%.

Figure 5B:
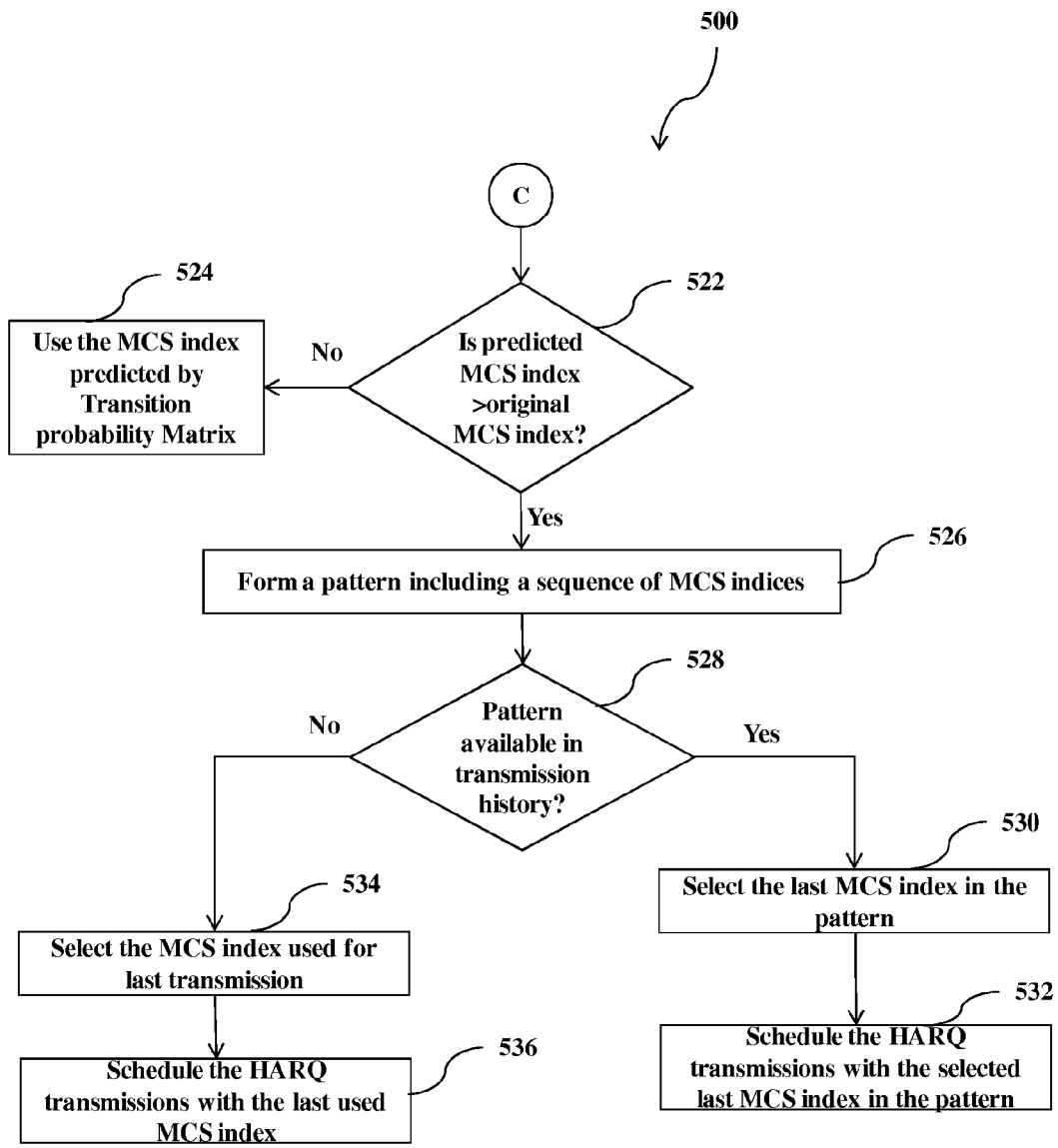
FIG. 5 is a flow diagram illustrating a method of selecting an MCS index using a sequence of pattern, according to embodiments disclosed herein.

FIG. 5 is a flowchart illustrating a method 500 of selecting an MCS index using a sequence of pattern, according to embodiments disclosed herein. In an embodiment, the method 500 includes the following steps:

At step 502: Perform HARQ transmission. After forming a transmission unit whose size is determined by a MCS index used and a number resource allocation units allocated. Based on the number of RAUs allocated during scheduling and the MCS Index chosen, an eNodeB can decide the amount of application data that can be transmitted in this transmission opportunity. The eNodeB combines all the allocated RAUs, adds Forward Error Correction (FEC) coding information and transmits it as Transport Blocks (TB). This FEC coding information used by the UE to do error detection and error correction in case of erroneous transmission. Either if there is no error or if FEC coding is sufficient to do error correction the UE sends a HARQ ACK, else sends a HARQ NACK. When a NACK is received, the eNodeB increases the coding level and transmits the same TB, when the corresponding UE gets scheduling opportunity. This process is repeated either until the UEs receives the TB without error or if the process has been repeated a predetermined maximum number of times. There is an unavoidable delay between the instance at which the eNodeB transmits the TB and the instance at which it receives ACK/NACK from the UE. But the eNodeB can schedule the same UE using another instance HARQ. Each instance of HARQ is called HARQ process.

At step 504: [Sub-frame m, Receiver]: Perform HARQ reception to determine if a current transmission is HARQ success or failure.

At step 506: Determine whether the frame is a CQI feedback Frame?

At step 508: HARQ transmission status (m+b+1) [Sub-frame m+b, Receiver]: Transmit ACK/NACK feedback to the transmitter.

At step 510: If the current feedback CQI feedback, then the CQI information is reported to the transmitter (update transition table). This step may not occur for every sub-frame.

At step 512: Calculate the correction offset δack or δnack based HARQ feedback using any suitable feedback correction method (m+b+1).

At step 514: Correct the transition probability matrix with the correction offset (m+b+1) from the step 512.

At step 516: Map MCS index w from CQI index q and update transition probability matrix (m+b+1)

At step 518: MCS index can be predicted based Transition Probability Matrix (m+b+1) Take the $\psi_{n,r}(m)$, the MCS index predicted using the TPM as input. If no prediction is available use $\psi_{n,r}(m)$ At step 522: Determine whether the predicted MCS index, from the transition probability matrix is greater than the original MCS index.

At step 524: Use the MCS index predicted by the transition probability matrix if the predicted MCS index from the transition probability matrix is not greater than the original MCS index.

At step 526: Form a pattern including a sequence of MCS indices if the predicted MCS index from the transition probability matrix is greater than the original MCS index.

At step 528: Determine whether the pattern is available in transmission history (history sequence/dictionary)?

At step 530: Select the last MCS index in the pattern.

At step 532: Schedule the HARQ transmissions with the selected last MCS index in the pattern.

At step 534: Select the MCS index used for the last transmission.

At step 536: Schedule the HARQ transmissions with the last used MCS index for scheduling $r^{th}$ RAU.

$\psi_{n,r}(m)$, which is predicted from $X_n(m)$ can be either lesser than, equal to, or great then $\psi_{n,r}(m-\phi)$. When $\psi_{n,r}^*(m)$ is greater than $\psi_{n,r}(m)$ another level of prediction can be performed. The search can be performed in the history of MCS indices mapped from reported CQI and assert if $\psi_{n,r}^*(m)$ has been reported. Instead of searching $\psi_{n,s}^*(m)$ has been reported, a sequence that contains $\psi_{n,r}^*(m)$ along with few previous reported MCS indices can be searched. If such a sequence is found it implies that the same sequence of MCS index transitions has occurred even before. So it makes more sense to use $\psi_{n,r}^*(m)$ for the transmission.

If it is assumed that each receiver stores $\psi_{n,r}$ every h sub frame in a sequence called history sequence (HS). Let $Y_{n,s}(m)$ denote the history sequence for nth receiver on rth RAU. There can be R such sequence for each of the receiver. The size of $Y_{n,s}$ increases by 1 every time feedback happens for receiver n. The size of sequence at mth sub frame is [m/h]. During the CQI feedback, when mod (m, h)=0, $\psi_{n,r}(m)$ from $q_{n,s}(m)$ can be obtained and adjusted with the most recent correction offset $\delta_n$. This new $\psi_{n,r}(m)$ can be appended to $Y_{n,r}(m)$.

When the value of $\delta_n$ changes, $\psi_{n,r}(m)$ that can be appended to $Y_{n,r}(m)$ and can reflect the change. Therefore, whenever $\delta_n$ changes, subtract 1 from all the elements of $Y_{n,r}(m)$ Consider a pattern that can be searched in $Y_{n,s}(m)$. Let p denote the size of the Pattern Sequence (PS). The sequence can include $\psi_{n,s}^*(m)$ as its last element and the last p−1 elements from the $Y_{n,s}(m)$, as it's preceding (p−1) the elements in the same order.

When a search formed search pattern in $Y_{n,r}(m)$. When the search pattern is found, the prediction is confirmed and the $\psi_{n,r}^*(m)$ can be used for transmission if sth RAU is allocated. Else, $\psi_{n,r}(m)$ can be used. This operation of pattern matching is performed for each of the scheduled RAU for a given receiver.

The flow diagram in the FIG. 5 shows the steps involved in performing the TPM based prediction combined with the pattern matching based prediction. Instead of feeding the output of the TPM based prediction directly to scheduling, a pattern matching based prediction can be performed. The output of it can be given to the scheduler. The flow diagram in the FIG. 5 presents how the pattern matching based prediction is done. This method takes $\psi_{n,r}(m)$ as input which is predicted using the TPM. This method too can be performed as a supplementary to the TPM based prediction.

Consider the below numerical example. Let $\psi_{n,r}(m)=20$ and using $X_n(m)$ the system can predict $\psi_{n,s}^*(m)$ to be 22. Let the history sequence be:

$$Y_{n,r}(m)=(21,24,25,20,24,22,20,18,21,24,20,24) \quad (21)$$

Then the search pattern is:

$$Y_{n,r}^{pat}(m)=(20,24,22) \quad (22)$$

Since, search pattern can be found in $Y_{n,r}(m)$, $\psi_{n,r}^*(m)=22$

Figure 6:
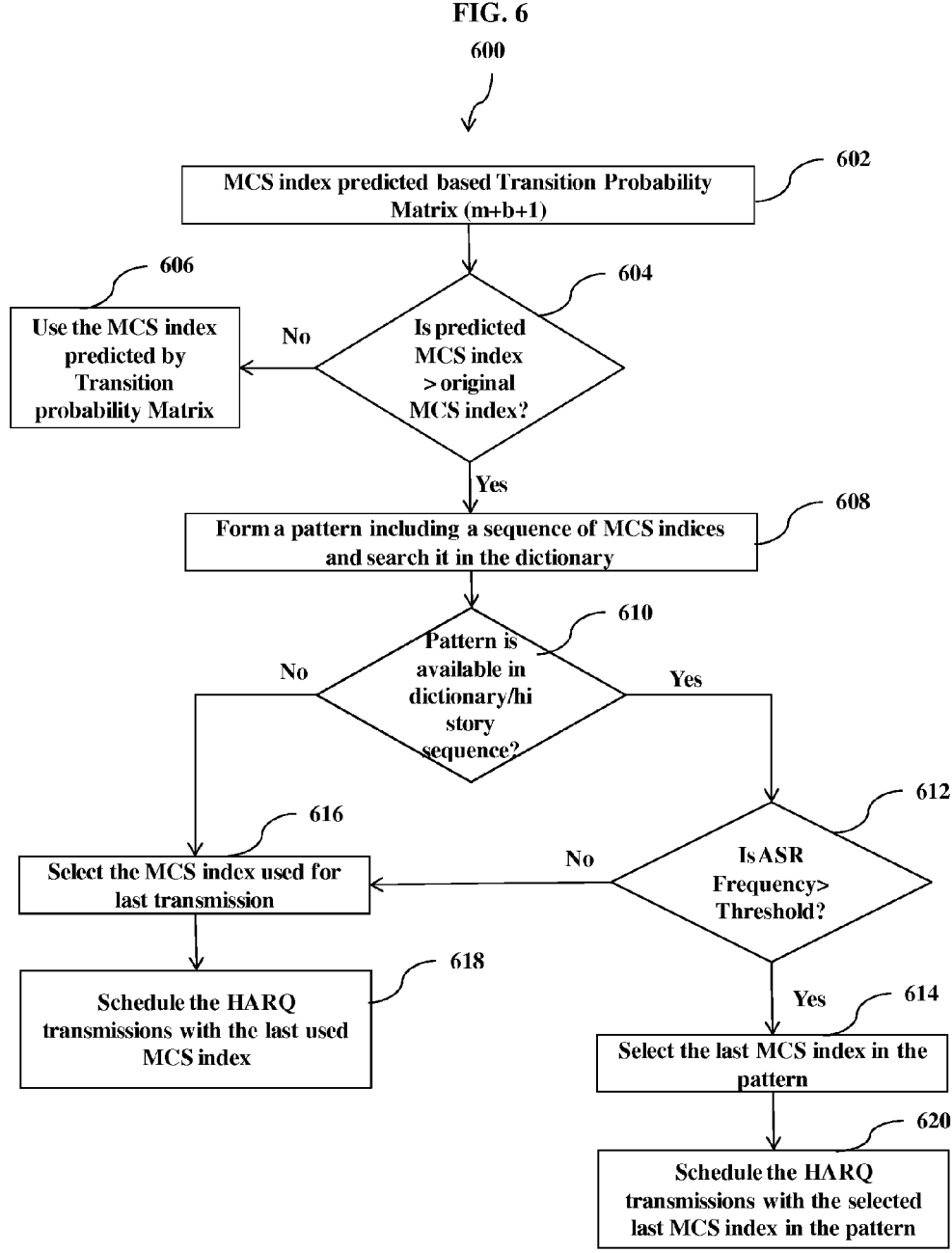
FIG. 6 is a flow diagram illustrating a method of selecting an MCS index using a sequence of pattern and frequency of pattern occurrence in a dictionary, according to embodiments disclosed herein.

FIG. 6 is a flowchart illustrating a method 600 of selecting an MCS index using a sequence of pattern and frequency of the pattern occurrence in a dictionary, according to embodiments disclosed herein. In an embodiment, the method 600 includes the following steps:

At step 602: MCS index predicted based Transition Probability Matrix (m+b+1). Consider the $\psi_{n,r}(m)$, the MCS index predicted using the TPM, as input.

At step 604: Determine whether the predicted MCS index, from the transition probability matrix is greater than the original MCS index.

At step 606: Use the MCS index predicted ($\psi_{n,r}(m)$) by Transition probability matrix if the predicted MCS index from the transition probability matrix is not greater than the original MCS index At step 608: Form a pattern including a sequence of MCS indices (as explained in equation 18 below) if the predicted MCS index from the transition probability matrix is greater than the original MCS index At step 610: Determine whether the formed pattern is available in dictionary/history sequence while performing a search?

At step 612: Determine whether the All Success Rate (ASR) frequency of the pattern is greater than a threshold if the pattern is found in the transmission history At step 614: Select the last MCS index in the pattern if the All Success Rate (ASR) frequency of the pattern is greater than a threshold At step 616: Select the MCS index used for the last transmission At step 618: Schedule the HARQ transmissions with the last used MCS index At step 620: Schedule the HARQ transmissions with the selected last MCS index in the pattern for scheduling $r^{th}$ RAU.

If a set of MCS indices occurring in particular sequence always leads to successful HARQ transmissions, then that information can be used for prediction. A dictionary can be maintained whose keys will be each possible ordered sequence for MCS indices of a particular size and the values corresponding to the keys will be the success rate. The success rate here will the ratio of number of time the sequence corresponding to the key resulted in sequence of all success to number of time such a sequence occurred.

Let us consider the numerical example. Let Y=(21, 22, and 24) be an ASR sequence which has occurred sufficient number of times. Consider the below sequence which represents the all the ψ used until current sub frame. {18, 19, 17, 20, 21, 22, 24, 20, . . . , 17, 17, 18, 18, 19, 21, 22, 24, 19, 18, . . . , 17, 18, 19, 17, 19, 20, 20, 1 8, 21, 22, 24, . . . , 20, 21, 22}

Observing the above sequence it can be observed that the sequence (21, 22, 24) has occurred 3 times and for the last two HARQ transmissions 21 and 22 were used in that order. Hence, according MCS index 24 is chosen and can have a higher probability of the HARQ success.

All the ASR sequence can be stored in a dictionary where the ASR sequence can be the key. The value corresponding to this key can be the number of times this ASR has occurred. In the system any value which is indicative of the frequency of occurrence of this ASR sequence can be stored. Every time v continuous HARQ success occurs, the corresponding ASR can be stored in the dictionary. This dictionary can be used to for predicting the current ψ which can have highest probability of the HARQ success.

FIG. 7 illustrates an example table showing different sequence of pattern (MCS indices) and the frequency of occurrence of each pattern in the dictionary, according to embodiments disclosed herein. Consider an example of a pattern sequence with ASR as (21, 19, and 18). From the table shown in the FIG. 7, it can be identified that frequency of occurrence of the pattern as 15.

Each time the TPM based prediction leads to $\psi_{n,s}(m-\phi) > \psi_{n,s}(m)$, the dictionary can be used for confirming this prediction. Let the PS be the sequence that can be looked up in the dictionary. The PS can be formed as explained in the previous method. Therefore, if the PS matches any key of the dictionary and if the corresponding value which indicates the frequency of the ASR is above certain threshold, then $\psi_v$ of the ASR is the predicted MCS index. Hence $\psi_{n,r}(m)$ can be changed to $v_v$.

Figure 8:
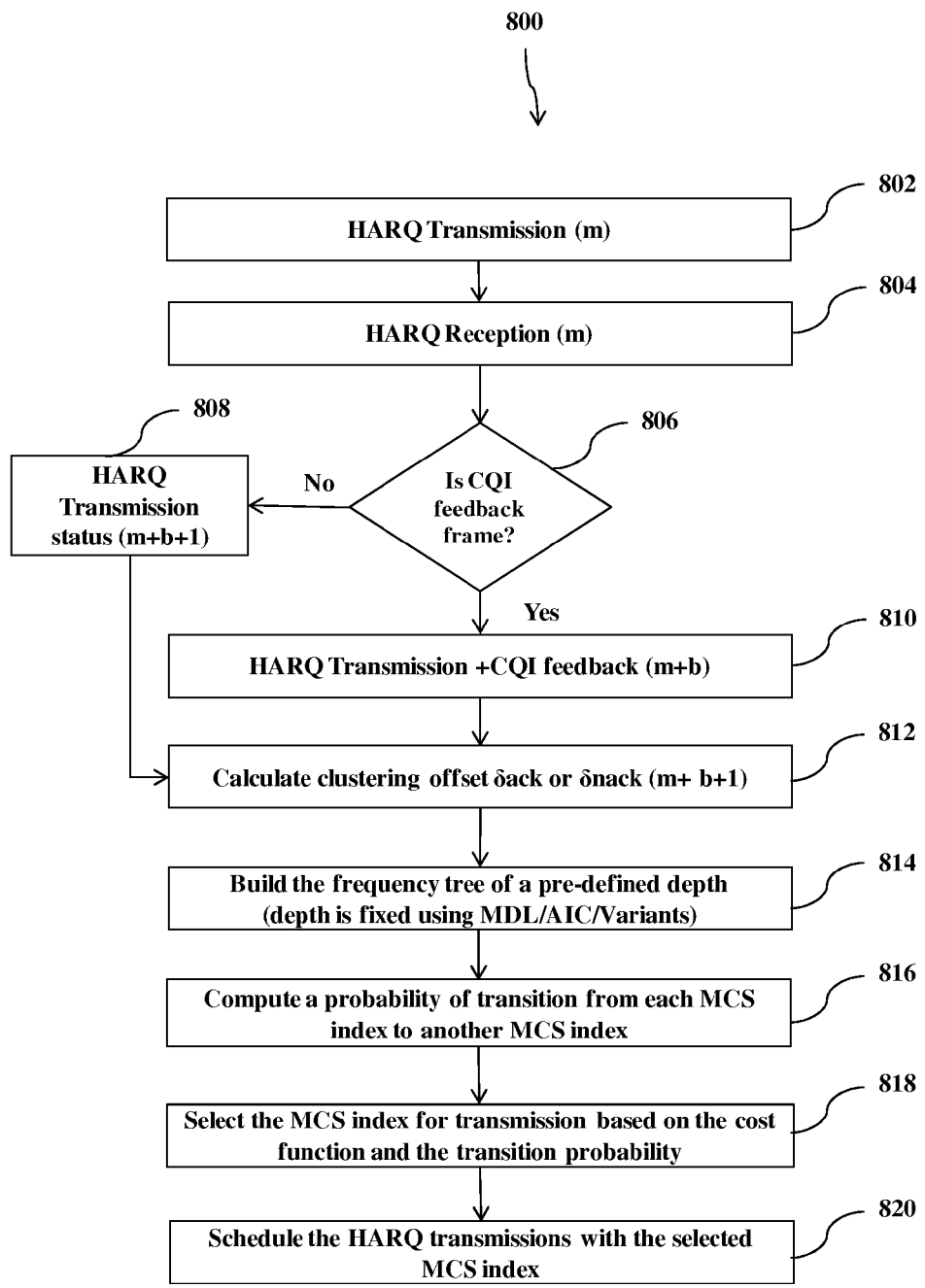
FIG. 8 is a flow chart illustrating a method of selecting an MCS index using a frequency tree of a given depth, according to embodiments disclosed herein.

FIG. 8 is a flow diagram illustrates describing a method 800 of selecting an MCS index using a frequency tree of a given depth, according to embodiments disclosed herein. In an embodiment, the method 800 includes the following steps:

At step 802: Perform HARQ transmission. After forming a transmission unit whose size is determined by a MCS index used and a number resource allocation units allocated. Based on the number of RAUs allocated during scheduling and the MCS Index chosen, an eNodeB can decide the amount of application data that can be transmitted in this transmission opportunity. The eNodeB combines all the allocated RAUs, adds Forward Error Correction (FEC) coding information and transmits it as Transport Blocks (TB). This FEC coding information can be used by the UE to do error detection, and error correction, in case of transmission with errors. Either if there is no error or if FEC coding is sufficient to do error correction the UE sends a HARQ ACK, else sends a HARQ NACK. When a NACK is received, the eNodeB increases the coding level and transmits the same TB, when the corresponding UE gets scheduling opportunity. This process is repeated either until the UEs receives the TB without error or if the process has been repeated a predetermined maximum number of times. There is an unavoidable delay between the instance at which the eNodeB transmits the TB and the instance at which it receives ACK/NACK from the UE. But the eNodeB can schedule the same UE using another instance HARQ. Each instance of HARQ is called HARQ process.

At step 804: Perform HARQ reception to determine if a current transmission is HARQ success or failure.

At step 806: Determine whether the frame is a CQI feedback frame?

At step 808: [Sub-frame m+b, Receiver]: Transmit ACK/NACK feedback to the transmitter.

At step 810: If the current feedback CQI feedback, then the CQI information is reported to the transmitter. This step may not occur for every sub frame.

At step 812: Calculate correction offset sack or snack (m+b+1) using the any suitable feedback based correction method.

At step 814: Build a frequency tree of a pre-defined depth. The depth of the frequency tree is fixed using Minimum Description Length (MDL)/Akaike Information Criterion (AIC)/Variants At step 816: Compute a probability of transition from each MCS index to another MCS index from the frequency tree.

At step 818: Select the MCS index for transmission based on the cost function and the transition probability.

At step 820: Schedule the HARQ transmissions with the selected MCS index.

Instead of using the transition probabilities based prediction and dictionary based pattern matching, techniques can be used that predict based on a dictionary-like learning mechanism as shown in the FIG. 8, which learns the patterns in sequences and predict them. The system can estimate the joint probability density function of different sub-sequences in the received sequence and use the density functions to perform prediction. This estimation of the joint probability functions can be done using some source coding techniques such as Lempel-Ziv, Prediction by Partial Match, etc. Source encoding and prediction are analogous problems in the sense that in source encoding the redundancy in the sequence can be removed, whereas in prediction the future values are predicted by exploiting the redundancy. To exploit the redundancy it is modeled first using source encoding techniques. The frequency tree constructed keeps count of frequencies of word occurrences up to a sequence length. Each $\psi_{n,s}(m)$ varies randomly with time. Since Ψ is discrete set, each of $\psi_{n,s}(m)$ can be defined as a discrete random variable. The transitions of discrete state random process can be represented using transition probability matrix. The system has NR such processes in the system. Ideally, N×R frequency trees are required to represent the system accurately.

Figure 9:
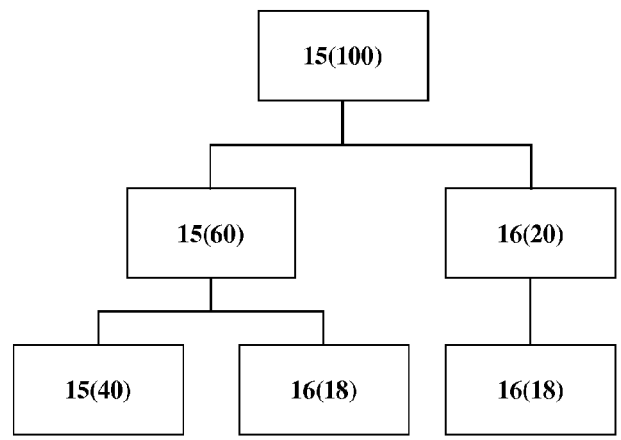
FIG. 9 illustrates an example frequency tree showing transition probability between MCS indices, according to embodiments disclosed herein.

FIG. 9 illustrates an example frequency tree showing transition probability between MCS indices, according to embodiments disclosed herein. The frequency trees contain the frequency of occurrence of k-length sequences. An example of the frequency tree is shown in the FIG. 9.

From this tree it can be inferred that when, a sequence of 15, 15 can be seen followed by 15, 40 times from this the probability of 15 following 15, 15 is given by 40/60. Using this, the probability of any MCS can be found given the whole tree. The tree construction is done using source encoding technique. Consider an example of one such technique is described below:

Step 0) Window$_{length}$=0, Window=NULL
Step 1) Assign W=NULL
Step 2) Append incoming character to W and Window, Window$_{length}$++
Step 3) If W is part of dictionary get next character and repeat from Step 2).
Step 4) If W is not part of dictionary add W to the dictionary
Step 5) Max$_{Windowlength}$=maximum$_{lengthphrase}$ in dictionary
Step 6) Update frequency tree based on all contexts in the current window-Window
Step 7) If Window$_{Length}$>Max$_{WindowLength}$ repeat from Step 0) else, repeat from Step 1)

Once the probability of all the indices is provided, the MCS can be selected with maximum probability of occurrence as the predicted MCS. This is the MAP estimator: $\hat{\psi}_{n,s}(m+1) = \mathrm{argmax}_{\psi(m+1)} P(\psi_{n,s}(m+1), \psi_{n,s}(m), \psi_{n,s}(m-1) \ldots \psi_{n,s}(m-k))$. This minimizes the probability of finding out an incorrect sequence. The system not only minimizes mis-prediction but maximizes the expected rate that can be transmitted, and, for this purpose, an error such that $\hat{\psi}_{n,s}(m+1) < \psi_{n,s}(m+1)$ has a smaller penalty than an error where $\hat{\psi}_{n,s}(m+1) > \psi_{n,s}(m+1)$. To implement this while predicting, it is assumed that, $C_{lm}$ can be the penalty in predicting $\hat{\psi}_{n,l}(m)$ when $\psi_{n,m}(m)$ is the true MCS, using the frequency tree to find the probability then the expected cost of predicting an MCS is given by: $C_l = \Sigma_{m=1}^{28} C_{lm} P_m$. The MCS with minimum $C_l$ is picked. An example penalty can be:

$$C_{lm} = \begin{cases} R_m - R_l & \text{if } R_l < R_m \\ R_m & \text{if } R_l > R_m \\ 0, & \text{if } R_l = R_m \end{cases}$$

where, $R_l$ is the predicted rate and $R_m$ is the true rate. If $C_{lm}=0$ for l=m and $C_{lm}=1$ otherwise, the MAP estimator is obtained.

Apart from this, since the source encoding techniques are also Markovian in nature, one need to find the order of the Markov chain to be used. To do this Akaike Information Criterion and Minimum Description Length can be used which are given below:

$$MDL(i) = -\ln(P(\psi_{n,s}(m-nh) \ldots \psi_{n,s}(m); \hat{\theta}_i \mid H_i)) + \frac{n_i}{2}\ln(N) \quad (23)$$

$$AIC(i) = -2\ln(P(\psi_{n,s}(m-nh) \ldots \psi_{n,s}(m); \hat{\theta}_i \mid H_i)) + 2n_i \quad (24)$$

One has to minimize the above equations with respect to in order to get the optimal model order. However, the above results are true only for infinite samples so and all finite corrections can be identified. An example of finite correction is given below:

$$AIC_c(i) = AIC(i) + \frac{2n_i(n_i-1)}{N-n_i-1}$$

Figure 10:
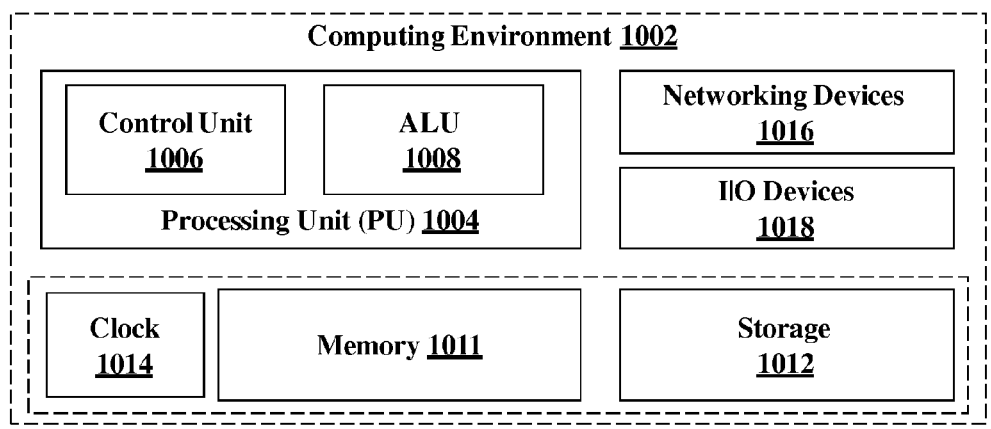
FIG. 10 illustrates a computing environment in which the system and methods can be implemented, according to embodiments disclosed herein.

FIG. 10 illustrates a computing environment in which the system and methods can be implemented, according to embodiments disclosed herein. As depicted the computing environment 1001 comprises at least one processing unit 1004 that is equipped with a control unit 1002 and an Arithmetic Logic Unit (ALU) 1003, a memory 1005, a storage unit 1006, plurality of networking devices 1008 and a plurality Input output (I/O) devices 1007. The processing unit 1004 is responsible for processing the instructions to perform various operations described herein. The processing unit 1004 receives commands from the control unit in order to perform its processing. Further, any logical and arithmetic operations involved in the execution of the instructions are computed with the help of the ALU 1003.

The overall computing environment 1001 can be composed of multiple homogeneous and/or heterogeneous cores, multiple CPUs of different kinds, special media and other accelerators. The processing unit 1004 is responsible for processing the instructions of the technique. Further, the plurality of processing units 1004 may be located on a single chip or over multiple chips. The technique comprising of instructions and codes required for the implementation are stored in either the memory unit 1005 or the storage 1006 or both. At the time of execution, the instructions may be fetched from the corresponding memory 1005 and/or storage 1006, and executed by the processing unit 1004.

In case of any hardware implementations various networking devices 1008 or external I/O devices 1007 may be connected to the computing environment to support the implementation through the networking unit and the I/O device unit.

The embodiments disclosed herein can be implemented through at least one software program running on at least one hardware device and performing network management functions to control the elements. The elements shown in figures include blocks, steps, units, acts, components, and the like which can be at least one of a hardware device, or a combination of hardware device and software module.

The embodiments disclosed herein can be implemented through at least one software program running on at least one hardware device and performing network management functions to control the elements. The elements shown in the FIGS. 1 to 10 may include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:
1. A method for selecting a modulation and coding scheme (MCS) for transmission on at least one communication channel, the method comprising:
computing at least one transition probability matrix including a plurality of MCS indices, wherein said transition probability matrix comprises at least one probability of transition from one MCS index to another MCS index in said plurality of MCS indices; and selecting a MCS index, from said plurality of MCS indices, having a highest transition probability in said transition probability matrix for transmission.

2. The method of claim 1, wherein said method further comprises:
computing an offset based on at least one transmission associated with at least one receiver;
modifying said at least one transition probability matrix in accordance with said offset; and
selecting a MCS index, from said plurality of MCS indices, having a highest transition probability in said modified transition probability matrix for transmission.

3. The method of claim 2, wherein computing said offset based on at least one transmission associated with said at least one receiver comprises:
identifying at least one sequence of Hybrid automatic repeat request (HARQ) transmission associated with said at least one receiver, wherein each said HARQ transmission is associated with a HARQ feedback indicating one of positive acknowledgement and negative acknowledgement; and
computing said offset based on said feedback associated with said at least one sequence of HARQ transmission.

4. The method of claim 2, wherein modifying said at least one transition probability matrix in accordance with said offset comprises:
identifying a sign of said offset associated with at least one sequence of HARQ transmission; and
modifying said at least one transition probability matrix in accordance with said sign of said offset.

5. The method of claim 1, wherein said at least one transition probability matrix is associated with at least one receiver, wherein each said receiver is associated with at least one resource allocation unit.

6. A method for selecting a Modulation and Coding Scheme (MCS) for transmission on at least one communication channel, the method comprising:
forming a pattern including a sequence of MCS indices, wherein each MCS index, in said sequence of MCS indices, is associated with a Hybrid automatic repeat request (HARQ) feedback indicating one of a positive acknowledgement and an negative acknowledgement;
determining whether said pattern including said sequence of MCS indices is available in a transmission history associated with at least one receiver; and
selecting last MCS index in said pattern including said sequence of MCS indices for transmission in response to determining that said pattern including said sequence of MCS indices is available in said transmission history.

7. The method of claim 6, wherein said method further comprises selecting a MCS index used for last transmission in response to determining that said pattern including said sequence of MCS indices is unavailable in said transmission history.

8. The method of claim 6, wherein said method further comprises:
computing a frequency of occurrence of said formed pattern in said transmission history associated with said at least one receiver in response to determining that said pattern including said sequence of MCS indices is available in said transmission history;
determining whether said frequency of occurrence of said pattern exceeds a threshold; and
selecting said last MCS index in said pattern including said sequence of MCS indices for transmission in response to determining that said frequency of occurrence of said pattern exceeds said threshold.

9. The method of claim 8, wherein said method further comprises selecting a MCS index used for last transmission in response to determining that said frequency of occurrence of said formed pattern is lower than said threshold.

10. The method of claim 6, wherein forming said pattern including said sequence of MCS indices comprises:
computing at least one transition probability matrix including a plurality of MCS indices, wherein said at least one transition probability matrix corresponds to at least one probability of transition from one MCS index to another MCS index in said plurality of MCS indices;
selecting said last MCS index for transmission corresponding to a highest transition probability in said at least one transition probability matrix;
determining whether said last MCS index is greater than current MCS index used for transmission; and
appending said last MCS index with said current MCS index to form said formed pattern including said sequence of MCS indices.

11. The method of claim 6, wherein said method further comprises:
computing an offset based on at least one transmission associated with said at least one receiver;
identifying a sign of said offset associated with at least one sequence of HARQ transmission; and
modifying said transmission history in accordance to said sign of said offset.

12. A method for selecting a Modulation and Coding Scheme (MCS) for transmission on at least one communication channel, the method comprising:
constructing a frequency database of at least one sequence of MCS indices used for transmission, wherein said frequency database corresponds to a frequency of appearance of each MCS index in said at least one sequence of MCS indices;
computing a probability of transition from one MCS index sub-sequence to another MCS index in said at least one sequence of MCS indices based on said frequency of appearance of each MCS index in said at least one sequence of MCS indices; and
selecting a MCS index, from said at least one sequence of MCS indices, having a highest probability of transition for transmission.

13. The method of claim 12, wherein said frequency database of said at least one sequence of MCS indices is constructed using a source encoding technique.

14. The method of claim 12, wherein said MCS index for transmission is selected by applying a cost function on said probability of transition associated with each said MCS index in said at least one sequence of MCS indices.

15. The method of claim 12, wherein said at least one sequence of MCS indices is defined from a transmission history associated with at least one receiver, wherein each said receiver is associated with at least one resource allocation unit.

16. The method of claim 12, wherein said method further comprises virtually truncating said frequency database to calculate said transition probabilities of said at least one sequence of MCS indices using a minimum description length technique.

17. The method of claim 12, wherein said method further comprises virtually truncating said frequency database to calculate said transition probabilities of said at least one sequence of MCS indices using an Akaike Information Criterion technique.

18. The method of claim 12, wherein said method further comprises:
computing an offset based on at least one transmission associated with said at least one receiver;
identifying a sign of said offset associated with at least one sequence of Hybrid automatic repeat request (HARQ) transmission; and
modifying said frequency database of at least one sequence of MCS indices in accordance to said sign of said offset.

19. An electronic device to select a modulation and coding scheme for transmission on at least one communication channel, the electronic device comprising:
a transition probability module configured to compute at least one transition probability matrix including a plurality of MCS indices, wherein said transition probability matrix comprises at least one probability of transition from one MCS index to another MCS index in said plurality of MCS indices; and
a controller module configured to select a MCS index, from said plurality of MCS indices, having a highest transition probability in said transition probability matrix for transmission.

20. The electronic device of claim 19, wherein said controller module is further configured to:
compute an offset based on at least one transmission associated with at least one receiver;
modify said at least one transition probability matrix in accordance with said offset; and
select a MCS index, from said plurality of MCS indices, having a highest transition probability in said modified transition probability matrix for transmission.

21. The electronic device of claim 20, wherein compute said offset based on at least one transmission associated with said at least one receiver comprises:
identify at least one sequence of Hybrid automatic repeat request (HARQ) transmission associated with said at least one receiver, wherein each said HARQ transmission is associated with a HARQ feedback indicating one of positive acknowledgement and negative acknowledgement; and
compute said offset based on said feedback associated with said at least one sequence of HARQ transmission.

22. The electronic device of claim 20, wherein modify said at least one transition probability matrix in accordance with said offset comprises:
identify a sign of said offset associated with at least one sequence of HARQ transmission; and
modify said at least one transition probability matrix in accordance with said sign of said offset.

23. The electronic device of claim 19, wherein said at least one transition probability matrix is associated with at least one receiver, wherein each said receiver is associated with at least one resource allocation unit.

24. An electronic device to select Modulation and Coding Scheme (MCS) for transmission on at least one communication channel, the electronic device comprising:
a pattern module configured to form a pattern including a sequence of MCS indices, wherein each MCS index, in said sequence of MCS indices, is associated with a Hybrid automatic repeat request (HARQ) feedback indicating one of a positive acknowledgement and an negative acknowledgement; and
a controller module configured to:
determine whether said pattern including said sequence of MCS indices is available in a transmission history associated with at least one receiver; and
select last MCS index in said pattern including said sequence of MCS indices for transmission in response to determining that said pattern including said sequence of MCS indices is available in said transmission history.

25. The electronic device of claim 24, wherein said controller module is further configured to select a MCS index used for last transmission in response to determining that said pattern including said sequence of MCS indices is unavailable in said transmission history.

26. The electronic device of claim 24, wherein said controller module is further configured to:
compute a frequency of occurrence of said formed pattern in said transmission history associated with said at least one receiver in response to determining that said pattern including said sequence of MCS indices is available in said transmission history;
determine whether said frequency of occurrence of said pattern exceeds a threshold; and
select said last MCS index in said pattern including said sequence of MCS indices for transmission in response to determining that said frequency of occurrence of said pattern exceeds said threshold.

27. The electronic device of claim 24, wherein said controller module is further configured to select a MCS index used for last transmission in response to determining that said frequency of occurrence of said formed pattern is lower than said threshold.

28. The electronic device of claim 24, wherein forming said pattern including said sequence of MCS indices comprises:
compute at least one transition probability matrix including a plurality of MCS indices, wherein said at least one transition probability matrix corresponds to at least one probability of transition from one MCS index to another MCS index in said plurality of MCS indices;
select said last MCS index for transmission corresponding to a highest transition probability in said at least one transition probability matrix;
determine whether said last MCS index is greater than current MCS index used for transmission; and
append said last MCS index with said current MCS index to form said formed pattern including said sequence of MCS indices.

29. The electronic device of claim 24, wherein said controller module is further configured to:
compute an offset based on at least one transmission associated with at least one receiver;
identify a sign of said offset associated with at least one sequence of HARQ transmission; and
modify said transmission history in accordance to said sign of said offset.

30. An electronic device to select a Modulation and Coding Scheme (MCS) for transmission on at least one communication channel, the electronic device comprising:
a builder module configured to construct a frequency database of at least one sequence of MCS indices used for transmission, wherein said frequency database corresponds to a frequency of appearance of each MCS index in said at least one sequence of MCS indices; and
a controller module configured to:
compute a probability of transition from one MCS index sub-sequence to another MCS index in said at least one sequence of MCS indices based on said frequency of appearance of each MCS index in said at least one sequence of MCS indices; and select a MCS index from said at least one sequence of MCS indices, having a highest probability of transition for transmission.

31. The electronic device of claim 30, wherein said frequency database of said at least one sequence of MCS indices is constructed using a source encoding technique.

32. The electronic device of claim 30, wherein configured to select said MCS index for transmission is selected by applying a cost function on said probability of transition associated with each said MCS index in said at least one sequence of MCS indices.

33. The electronic device of claim 30, wherein said at least one sequence of MCS index indices is defined from a transmission history associated with at least one receiver, wherein each said receiver is associated with at least one resource allocation unit.

34. The electronic device of claim 30, wherein said controller module is further configured to virtually truncate said frequency database to calculate said transition probabilities of said at least one sequence of MCS indices using a minimum description length technique.

35. The electronic device of claim 30, wherein said controller module is further configured to virtually truncate said frequency database to calculate said transition probabilities of said at least one sequence of MCS indices using an Akaike Information Criterion technique.

36. The electronic device of claim 30, wherein said controller module is further configured to:

compute an offset based on at least one transmission associated with said at least one receiver;

identify a sign of said offset associated with at least one sequence of Hybrid automatic repeat request (HARQ) transmission; and modify said frequency database of at least one sequence of MCS indices in accordance to said sign of said offset.

* * * * *